United States Patent [19]
Suzuki

[11] Patent Number: 5,872,600
[45] Date of Patent: Feb. 16, 1999

[54] CONVERSION OF INTERLACED PICTURE SIGNALS TO FILM PICTURE SIGNALS BY DETECTING A PATTERN AND REMOVING SELECTED FIELDS AS DEFINED BY THE INTERLACED PICTURE SIGNALS BASED ON THE DETECTED PATTERN

[75] Inventor: Kazuhiro Suzuki, Kanagawa, Japan

[73] Assignee: Sony Corporation, Tokyo, Japan

[21] Appl. No.: 667,821

[22] Filed: Jun. 20, 1996

[30] Foreign Application Priority Data

Jun. 29, 1995 [JP] Japan ................................. 7-164137

[51] Int. Cl.⁶ .................................................. H04N 7/01
[52] U.S. Cl. ........................................... 348/459; 348/441
[58] Field of Search ................................... 348/459, 458, 348/911, 97, 448, 441, 558

[56] References Cited

U.S. PATENT DOCUMENTS 5,115,311  5/1992  Jaqua ........................................ 348/911
5,353,119 10/1994  Dorricott et al. ........................ 348/459

Primary Examiner—Victor R. Kostak
Attorney, Agent, or Firm—Frommer Lawrence & Haug LLP; William S. Frommer

[57] ABSTRACT

A picture signal processing apparatus in which video source signals, that is interlaced video signals conforming to, for example, the NTSC standard television broadcasting system, obtained on conversion (so-called tele-cine conversion) from a 24-picture frame-per-second picture from a film source, such as a motion picture, are reconverted for generating signals corresponding to a pre-tele-cine-conversion picture, that is picture signals of 24 picture frames per second directly obtained from the film source. The signals corresponding to a picture prior to tele-cine conversion may be restored even from video source picture signals produced on tele-cine conversion in which the picture frame breaking point is not coincident with the field boundary.

16 Claims, 18 Drawing Sheets

CONVERSION OF INTERLACED PICTURE SIGNALS TO FILM PICTURE SIGNALS BY DETECTING A PATTERN AND REMOVING SELECTED FIELDS AS DEFINED BY THE INTERLACED PICTURE SIGNALS BASED ON THE DETECTED PATTERN

BACKGROUND OF THE INVENTION

1. Field of the Invention

This invention relates to a picture signal processing method and apparatus in which video source signals, that is interlaced video signals conforming to, for example, NTSC standard television broadcasting system, obtained on conversion (so-called tele-cine conversion) from a 24-picture frame-per-second picture from a film source, such as a motion picture, are re-converted for generating the signals corresponding to a pre-tele-cine-conversion picture, that is picture signals of 24 picture frames per second directly obtained from the film source.

2. Description of the Related Art

For converting a 24-picture frame-per-second picture, obtained from a film source, such as a motion picture, into a 30-frame-per-second interlaced video signals of, for example, the NTSC system, as one of the standard television broadcasting systems, by so-called tele-cine conversion, the frame number conversion, more specifically, the field number conversion, is performed for matching two picture frames of the film to 2.5 frames or five fields of the NTSC system, because the rate of pictures obtained from the film source is 24 picture frames per second, whereas that of pictures of the NTSC system is 30 frames per second, more precisely, 29.97 frames per second, or 60 fields per second.

As a technique for such tele-cine conversion, a so-called 2-3 pull-down method, is widely employed.

If the respective picture frames of a film are denoted by picture frame numbers of 1, 2, 3, . . . , first and second fields making up a frame of the NTSC interlaced video signals are denoted as f1 and f2 and pictures represented as the field f1 or the field f2 are associated with the picture frame numbers, picture signals of the two fields of the first and second field f1 and f2 making up a sole frame of the interlaced video signals are generated in the 2-3 pull down from a picture of the picture frame number 1, picture signals of the next three fields are generated from a picture of the picture frame number 2 and picture signals of the next two fields are generated from a picture of the picture frame number 3, as shown in FIG. 1. This sequence of operations is performed repeatedly. In an example shown in FIG. 1, a one-frame picture in the NTSC system is split into a top half T and a bottom half B and respective pictures in these half portions are indicated in association with the picture frame numbers. In FIG. 1, $b_f$ and $b_F$ denote a boundary between the first field f1 and the second field f2 in one frame and a boundary between frames, respectively.

For re-converting video-source signals, that is interlaced video signals of the NTSC system, obtained by the above-described tele-cine conversion, for regenerating signals corresponding to pre-tele-cine conversion pictures, that is the same 24-picture frame-per-second picture signal as those directly obtained from the film source, the conversion operation as shown for example in FIG. 2 is performed. The manner of representation in FIG. 2 is similar to that in FIG. 1. Such regeneration of the same picture signals as those from the original film source from the video source signals obtained on tele-cine conversion is termed hereinafter as the reverse tele-cine conversion.

In the reverse tele-cine conversion, the fields having overlapped contents are detected and deleted from the video-source picture signals and the 24-picture frame-per-second picture signals are generated from the remaining picture signals, as shown in FIG. 2. Meanwhile, the fields to be deleted in the above example are third fields, for example, in case the picture from the same picture frame of the film occurs three successive fields.

If tele-cine conversion is performed so that the picture frame boundary in the film source is coincident with the frame or field boundary in the video source, as shown in FIG. 1, reverse tele-cine conversion becomes easily feasible by a method shown in FIG. 2.

However, depending on the sorts of the tele-cine conversion devices employed, conversion may be performed such that the picture frame boundary in the film source is not coincident with the frame or field boundary in the video source of, for example, the NTSC system, with the picture displayed in the top half T being different from that displayed in the bottom half B, that is with the pictures from different picture frames being displayed in these top and bottom half portions. This results from the fact that, although the film playback time and the time of the video signal produced on tele-cine conversion are synchronized with each other, there is a lack of phase control between the picture frames and the fields, that is that the picture frame breaking points are not controlled to be coincident with the field boundaries. In addition, the phase difference between the picture frames and the fields, that is a time period in which the picture frame breaking points coincide with the field boundaries, is not constant and depends upon the tele-cine conversion devices employed.

Thus, if the NTSC system video source, obtained by the tele-cine conversion device, is reverse tele-cine converted by the technique described above, pictures of picture frames previous or subsequent to a picture frame marked with an asterisk *, obtained on reverse tele-cine conversion, exist in the picture of the picture frame, as shown in FIG. 4 similar in the manner of representation to FIG. 2, such that a satisfactory picture cannot be obtained. For example, a field f1 of a frame indicated by a frame number F2 in the video source of the NTSC system shown in FIG. 4 is composed of the top half portion T and the bottom half portion B derived from different picture frames, that is the picture frames of the picture frame numbers 1 and 2, such that the picture obtained on reverse tele-cine conversion of the picture signals having the frame number F2 are deteriorated in picture quality.

In addition, with the above technique for reverse tele-cine conversion, it is difficult to detect the fields to be deleted from the video source shown in FIG. 3.

SUMMARY OF THE INVENTION

It is therefore an object of the present invention to provide a method and apparatus for processing picture signals in which signals corresponding to the pictures prior to tele-cine conversion, that is the same 24-picture frame-per-second picture signals as those directly obtained from the original film source, may be obtained even from video-source picture signals obtained on tele-cine conversion in which picture frame breaking points are not coincident with the field boundary points.

The picture signal processing method for regenerating picture signals corresponding to a film source picture from interlaced picture signals obtained on tele-cine conversion of the film source picture, according to the present invention, includes the steps of calculating a field-based difference value from the interlaced picture signals detecting a pre-set pattern in the interlaced picture signals including a portion of non-coincidence of a field or frame boundary with the boundary of the film-source picture based on the calculated difference value, deleting unneeded fields from the interlaced picture signals responsive to the detected pre-set pattern, and regenerating picture signals corresponding to the film source picture from the interlaced picture signals left after deletion of the unneeded fields responsive to the detected pre-set pattern.

The picture signal processing apparatus for regenerating picture signals corresponding to a film source picture from interlaced picture signals obtained on tele-cine conversion of the film source picture includes means for calculating a field-based difference value from the interlace picture signals, means for detecting a pre-set pattern in the interlaced picture signals having a portion of non-coincidence of a field or frame boundary with the boundary of said film-source picture based on the calculated difference value, means for deleting unneeded fields from the interlaced picture signals responsive to the detected pre-set pattern, and means for regenerating picture signals corresponding to the film source picture responsive to the detected pre-set pattern from the interlaced picture signals left after deletion of the unneeded fields.

According to the present invention, since the portion of non-coincidence between the boundary of the film source picture and the boundary of the frame or field of interlaced picture signals is deleted as unneeded field and picture signals corresponding to the film source picture is regenerated from the picture signals left after the deletion of the unneeded field, there is no risk of pictures of different contents being present in the regenerated picture signals corresponding to a picture.

DESCRIPTION OF THE PREFERRED EMBODIMENTS

Figure 1:
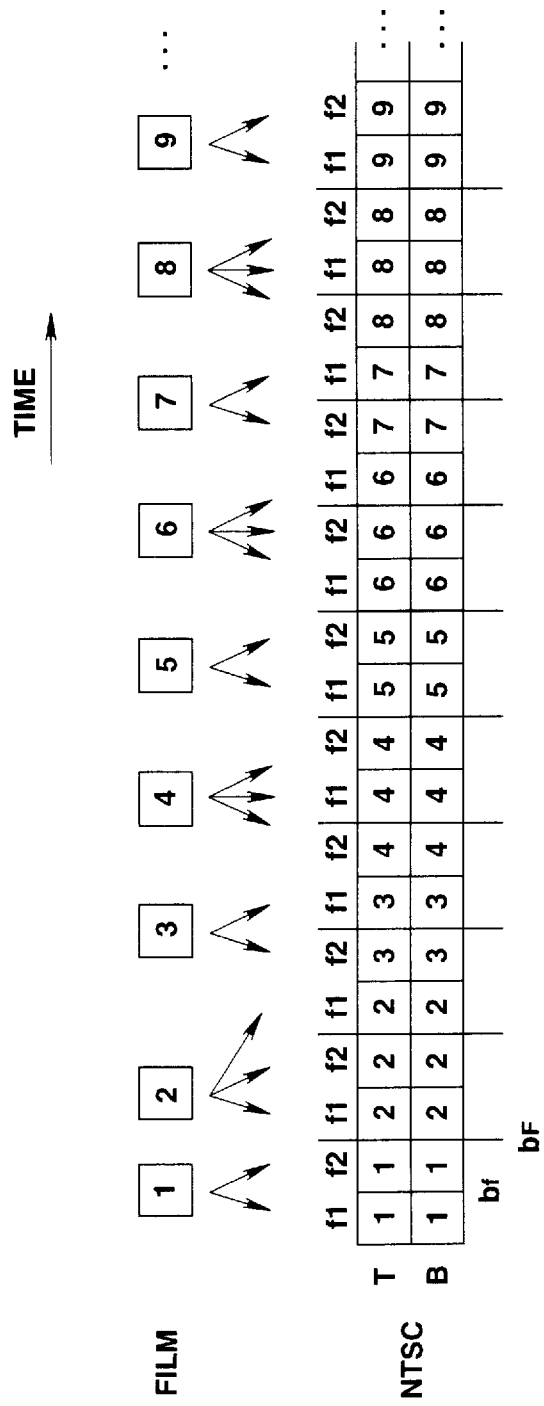
FIG. 1 illustrates tele-cine conversion in which picture frame boundary points are coincident with field boundary points.

Referring to the drawings, preferred embodiments of the present invention will be explained in detail.

In the picture signal processing method of the present invention, in restoring data corresponding to a picture previous to tele-cine conversion, that is video data of 24 picture frames per second, which is the same data as that directly obtained from the original film source, from video data of the video source of, for example, the NTSC system, in which tele-cine conversion has been performed such that picture frame boundary points are not coincident with field boundary points, a field or frame the pictures in the top half T and the bottom half B of which has been obtained from different picture frames is not used, and a picture corresponding to one picture frame of a film is restored only from a picture of a field or a frame the pictures in the top half T and in the bottom half B of which fully correspond to the pictures in the original film previous to tele-cine conversion.

Figure 5:
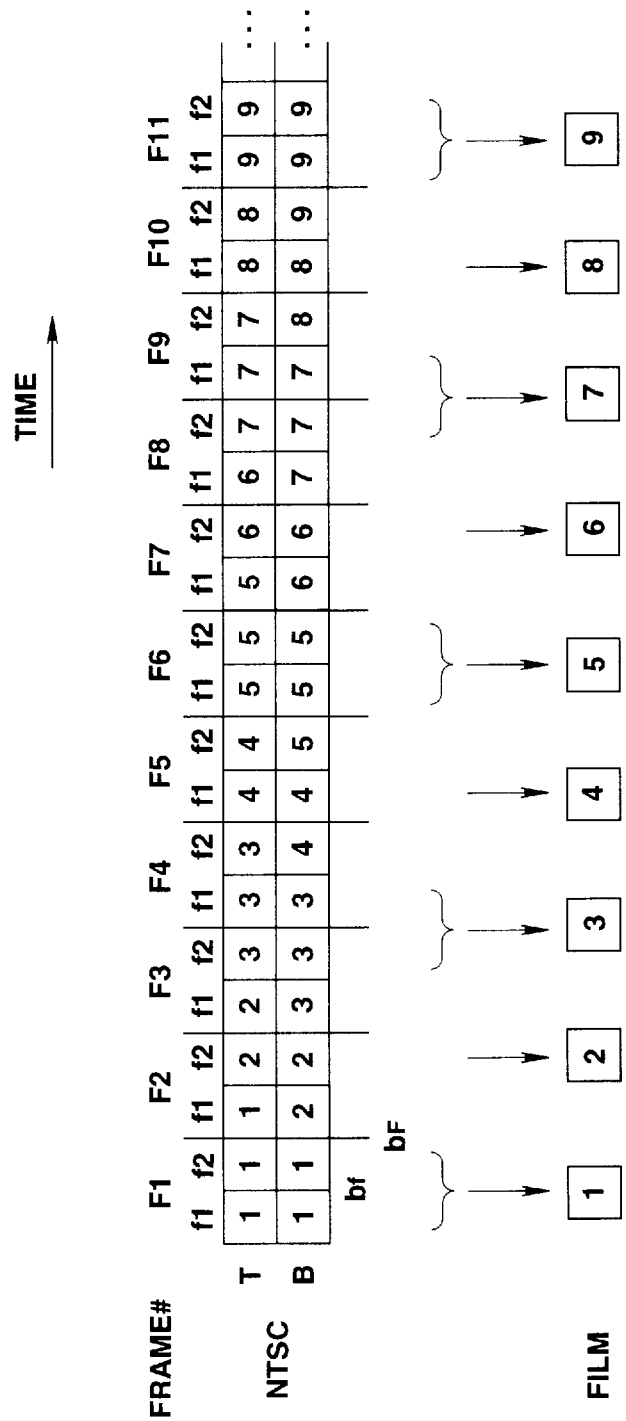
FIG. 5 illustrates the outline of the reverse tele-cine conversion of a first embodiment of the present invention.

Referring more specifically to FIG. 5, since the pictures of the upper half portions T and the bottom half portions B of the first field f1 and the second field f2 of the pictures of the frame number F1 of the video source data are composed in their entirety of the picture of the picture frame number 1 of the original film source data, the picture corresponding to the picture frame number 1 is restored from the pictures of the first field f1 and the second field f2 of the frame number F1.

Next, the pictures of the picture frame number 2 of the original film source are present in the pictures of the frame numbers F2 and F3. However, since the first field f1 of the frame number F2 and the first field f1 of the frame number F3 are composed of pictures of the top half T and the bottom half B derived from different picture frames, while only the second field f2 of the frame number F2 is composed of pictures of the top half T and the bottom half B derived from the pictures of the picture frame number 2. Therefore, the picture of the picture frame number 2 is restored from the pictures of the second field f2 of the frame number F2.

Next, the pictures of the picture frame number 3 of the original film source are present in the pictures of the frame numbers F3 and F4. However, since the first field f1 of the frame number F3 and the second field f2 of the frame number F4 are composed of pictures of the top half T and the bottom half B derived from different picture frames, while only the second field f2 of the frame number F3 and the first field f1 of the frame number F4 are composed of pictures of the top half T and the bottom half B derived from the pictures of the picture frame number 3. Therefore, the picture of the picture frame number 3 is restored from the pictures of the second field f2 of the frame number F3 and from the first field f1 of the frame number F4.

Next, the pictures of the picture frame number 4 of the original film source are present in the pictures of the frame numbers F4 and F5. However, since the second field f2 of the frame number F4 and the second field f2 of the frame number F5 are composed of pictures of the top half T and the bottom half B derived from different picture frames, while only the first field f1 of the frame number F5 is composed of pictures of the top half T and the bottom half B derived from the pictures of the picture frame number 4. Therefore, the picture of the picture frame number 4 is restored from the pictures of the first field f1 of the frame number F5.

The pictures of the picture frame numbers 5, 6, . . . are restored in a similar manner.

In the present embodiment, described above, a picture of a picture frame of a film is restored only from the picture of a field or a frame the pictures in the top half T and the bottom half B of which fully coincide with the picture in a picture frame of the original film prior to tele-cine conversion. However, for restoring a picture corresponding to a film picture frame from video source data, such a field the pictures in the top half T and in the bottom half B of which fully coincide with the picture in the original film prior to tele-cine conversion has to be found. Stated differently, if desired to restore a picture of the picture frame of the original film by reverse tele-cine conversion, the field comprised of a picture of the top half T and a picture of the bottom half B derived from different picture frames of the original film source has to be found as a field not used, that is as a field to be deleted.

Scrutinizing an example of the video source of the NTSC system, shown in FIG. 5, the frames among those having the frame numbers F1, F2, F3, . . . in which both the pictures of the first field f1 and the second field f2 are derived from the pictures of the same picture frame numbers of the original film source are the frames having the frame numbers F1, F6, F11, . . . thus appearing regularly at an interval of four frames.

Scrutinizing further into the example of the video source of the NTSC system shown in FIG. 5, the fields of the four frames F2, F3, F4 and F5 between the frame numbers F1 and F6 in which the pictures are derived from the same picture frame of the original film are second fields f2 of the frame numbers F2 and F3 and first fields f1 of the frame numbers F4 and F5. The same rule holds for the four frames between the frame numbers F6 and F11 and, although not shown, for the four frames between the frame numbers F11 and F16 and so forth.

From the above rule, it follows that, if the frames the pictures of the first field f1 and the second field f2 of which are derived from the picture of the same picture frame number of the original film source can be detected, such a field in which the pictures are derived from the same picture frame of the original film can be found in each of the four frames between the detected frames. Stated differently, if the frame composed only of pictures of the same picture frame number of the original film source can be detected, it is possible to find the field to be deleted on restoration in the picture of the picture frame obtained on tele-cine conversion in each of the four frames lying between these detected frames.

Thus the first embodiment of the present invention is directed to a picture signal processing method for regenerating picture signals corresponding to a film source picture from interlaced picture signals obtained on tele-cine conversion of the film source picture, in which a field-based difference value is calculated from the interlaced picture signals, a pre-set pattern P in the interlaced picture signals including a portion of non-coincidence of a field or frame boundary with the boundary of the film-source picture is detected based on the calculated difference value, unneeded fields are deleted from the interlaced picture signals responsive to the detected pre-set pattern, and picture signals corresponding to the film source picture are regenerated from the interlaced picture signals left after deletion of the unneeded fields responsive to the detected preset pattern.

Figure 6:
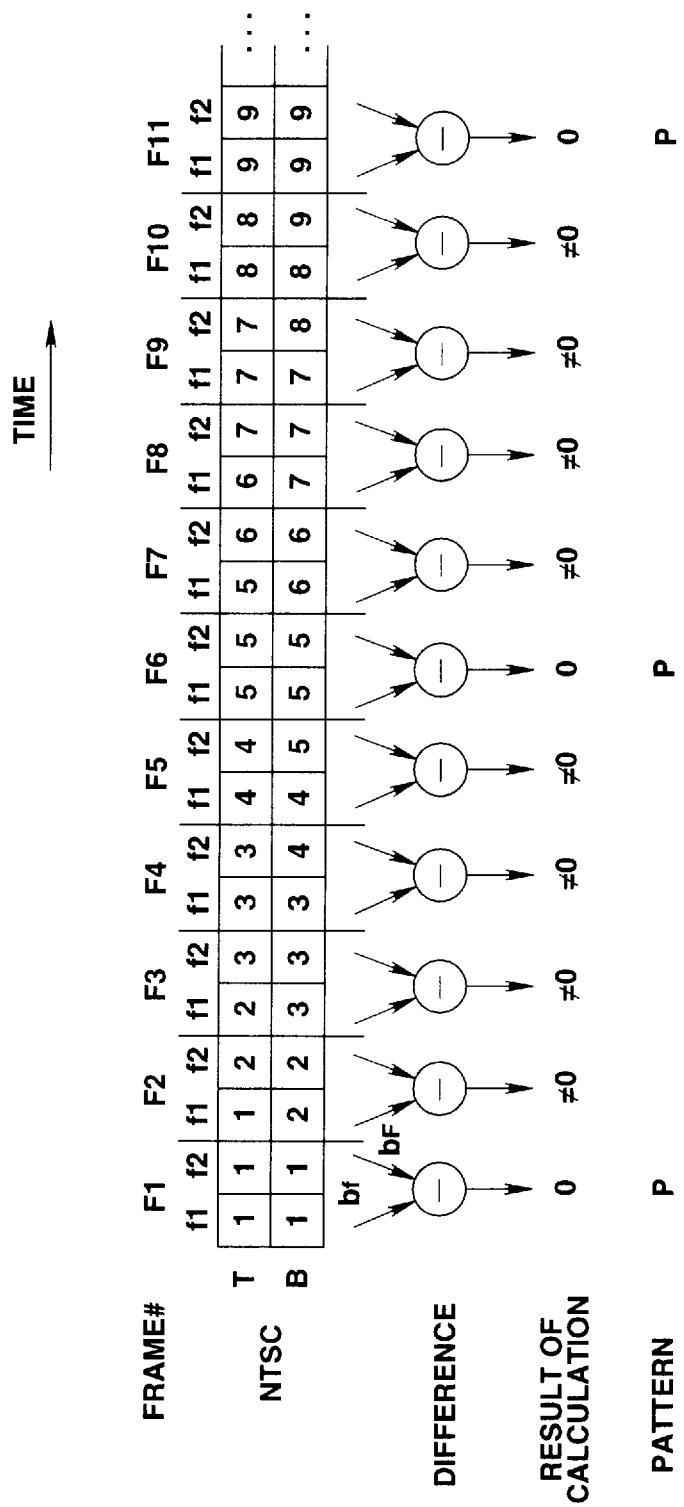
FIG. 6 illustrates the manner of detection of a pattern P.

Referring more specifically to FIG. 6, it is assumed that the frame numbers of the video source data are denoted as $5n+k$ where $n=0, 1, 2, \ldots$, $k=0, 1, 2, \ldots$ and $5n+k=0, 1, 2, \ldots$. Of the past T frames, inclusive of the current frame $(5n+k)$, the differences of the pixels are found between the first field f1 and the second field f2 of the frame $(5n+k)$ and the numbers of the cases in which the square sums of the pixel-based differences become smaller than a pre-set value D are collected for different values of k. The value of k with the maximum value of the number is detected as a pattern P. The frame corresponding to this pattern P may safely be taken as being a frame composed only of pictures having the same picture frame number of the original film source. The above value for T is, for example, 30 (30 frames). It should be noted that the above difference is all 0 for a still picture and the pattern P cannot be detected, so that a longer range of, for example, 30 frames, needs to be used.

Figure 3:
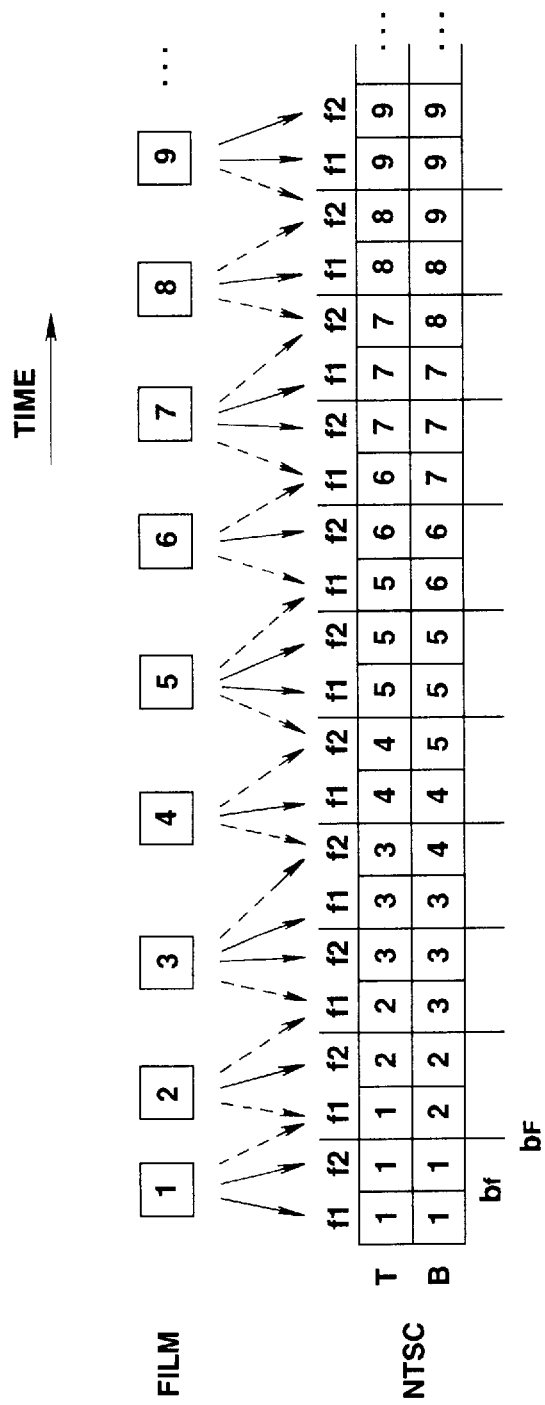
FIG. 3 illustrates tele-cine conversion in which picture frame boundary points are not coincident with field boundary points.
Figure 4:
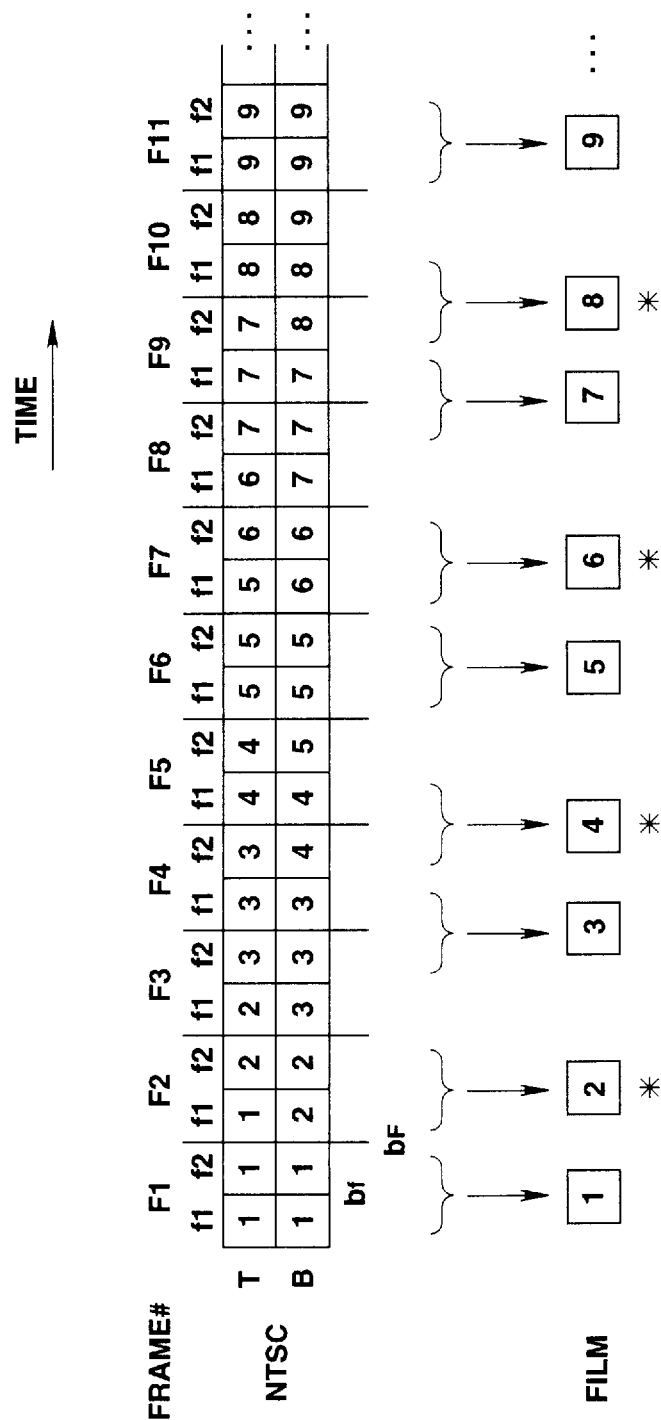
FIG. 4 illustrates the inconveniences that arise on reverse tele-cine conversion of video source signals for which the picture frame boundary points are not coincident with the field boundary points.
Figure 7:
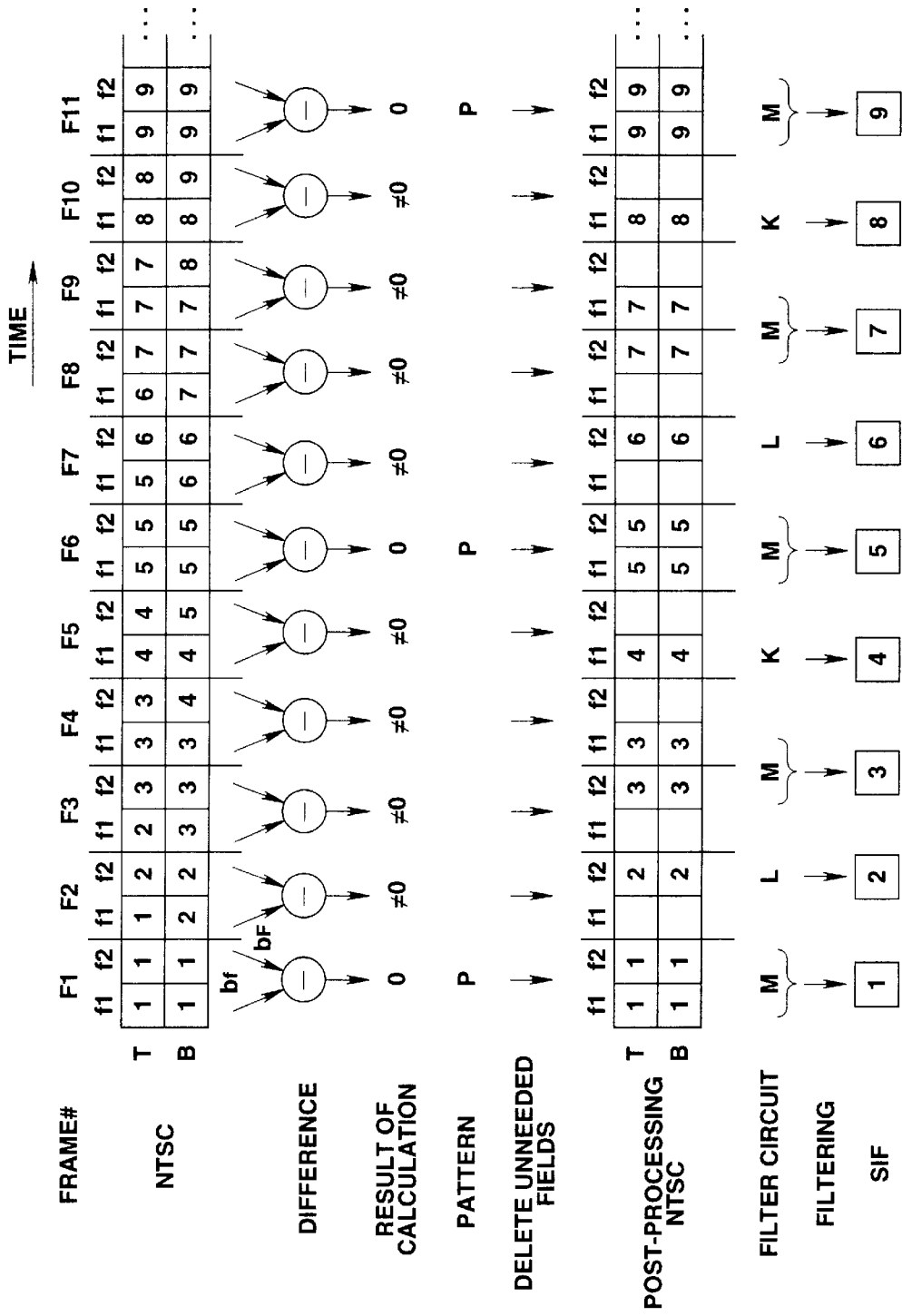
FIG. 7 illustrates the reverse tele-cine conversion of a first example of the first embodiment.

If the frame made up only of pictures of the frame corresponding to the pattern P, that is the frame made up only of the pictures of the picture frames of the original film source, unneeded fields can be detected from the NTSC system video source, based on the results of detection, as shown in FIG. 7, so that the unneeded fields can be deleted. The lower position of FIG. 3 shows video data NTSC freed of the unneeded fields (post-processing NTSC).

Picture signals corresponding to the picture frames of the film cam be produced from video data NTSC thus freed of the unneeded fields.

For restoring picture signals corresponding to the picture frames of the film, the original signals, from which the picture signals of the picture frame are produced, are classified into data of both the first and second fields, data only of the first field f1 and data only of the second field f2. Thus, for generating picture signals corresponding to respective picture frames of the film from these three kinds of data, it is necessary to perform restoration processing associated with the different data sorts. Both of the data of the first and second fields, employed for restoring the pictures of the picture frames of the original film, are not limited to data of the first and second field in the same frame, and may also be data of the second field of the temporally directly previous frame and data of the first field of the temporally directly succeeding frame.

Figure 8:
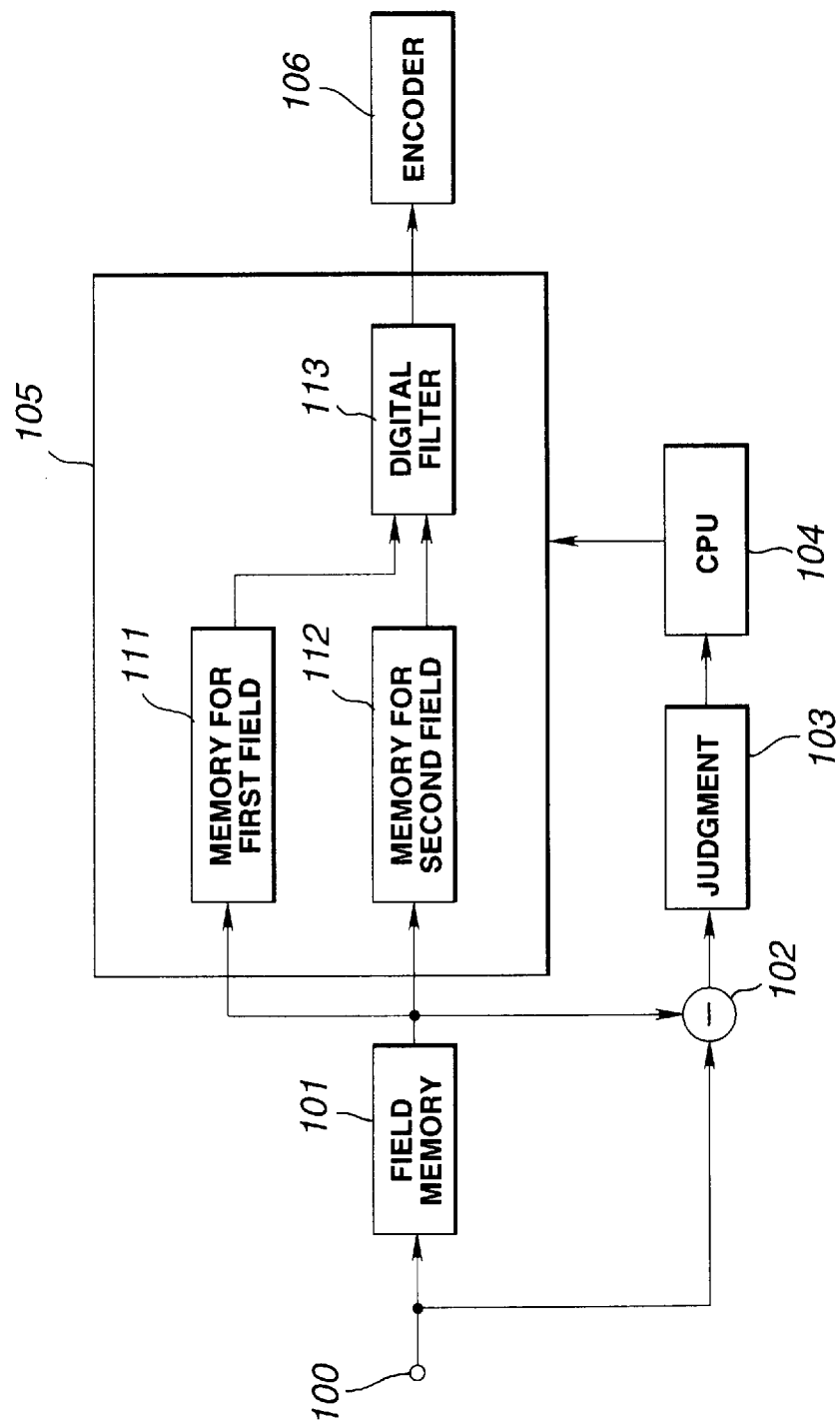
FIG. 8 is a schematic block circuit diagram of a picture signal processing apparatus for reverse tele-cine conversion.

Referring to FIG. 8 showing the basic structure of the reverse tele-cine conversion apparatus, an illustrative example of regenerating picture signal of the picture frames of the film from the above three sorts of data is explained. In the present example, a video source of a recommendation 601 (rec 601) of the D1 digital data source in CCIR is regenerated as a picture of a picture frame having a source input format (SIF) size which is the format for the picture file generally handled in MPEG (Moving Picture Experts group, an organization for research into encoding of moving pictures for storage). The resolution of the above rec601 and SIF are 720×240×60 fields and 360×240×30 frames (NTSC) for rec 601 and SIF, respectively.

The reverse tele-cine conversion device of the present embodiment regenerates picture signals corresponding to the film source picture from video data of the video source of, for example, the NTSC system, obtained on tele-cine conversion of the film source pictures. The reverse tele-cine conversion device includes a field memory 101 and a subtractor 102, as difference calculating means for calculating field-based differences from the video data of the video source, and a decision circuit 103, as pattern detection means for detecting a pre-set pattern P in the video data of the video source having non-coincidence between the boundary of the pictures of the picture frames of the film source and frame or field boundary points based on the calculated difference values. The reverse tele-cine conversion device also includes a CPU 104, as field deletion means, for deleting unneeded fields from the video data of the video source, a first field memory 111 and a second field memory 112. The reverse tele-cine conversion device further includes a digital filter 113, as regenerating means, for regenerating picture signals corresponding to the pictures of the picture frames of the film source from the video data freed of the unneeded fields.

Referring to FIG. 8, to an input terminal 100 is supplied video data of the video source obtained on tele-cine conversion in which the picture frame breaking points are not coincident with the field boundary points. The video data is sent to and stored in a field memory 101 so as to be read therefrom on the field basis. The video data supplied to the input terminal 100 is also sent to a subtractor 102. The subtractor 102 is also fed with field-based video data from the field memory 101. Thus the subtractor 102 calculates the pixel-based differences from the video data of the current field from the input terminal 102 and from the video data previous by, for example, one field with respect to the current field read out from the field memory 101.

The pixel-based difference data from the subtractor 102 is sent to a decision circuit 103. The decision circuit 103 finds the square sum d in the field from the pixel-based difference data, compares the sum d to the value D, collects the numbers of times the sum d becomes smaller than D, for each value of k, and detects the value of k with the largest number of times as a pattern P. The decision circuit 103 sends the pattern P detection signal to a central processing unit (CPU) 104.

Figure 9:
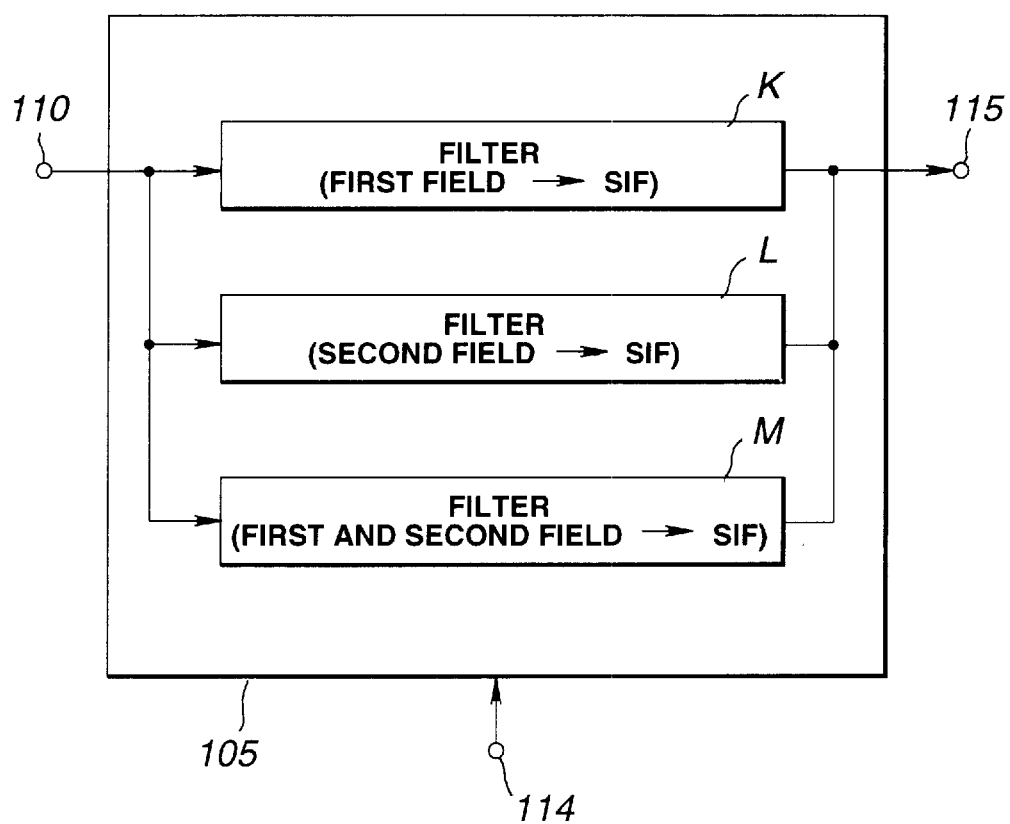
FIG. 9 is a schematic block circuit diagram showing a first example of a digital filter.

The filter circuit 105 includes a memory for the first field 111 and a memory for the second field 112, and a digital filter 113. Referring to FIG. 9, the digital filter 113 also includes a common filter 110 fed with video data from the memory of the first field 111 and the memory for the second field 112, a filter K for generating the SIF video data from the video data of the first field, a filter L for generating the SIF video data from the video data of the second field and a filter M for generating the SIF video data from the video data of the first and second fields. The digital filter also includes an output terminal 115 for outputting output data of the filters K, L and M to an encoding circuit 106 as later explained and a terminal 114 fed with a control signal from the CPU 104. The filter circuit 105 is responsive to a filter circuit switching command, supplied thereto as a control signal from the CPU 104, to execute write/read of video data for the memory of the first field 111 and the memory for the second field 112 and to do the switching of the filters K, L and M in the digital filter 113.

The CPU 104 sends to the filter circuit 105 a filter circuit switching command conforming to the above rule, based on the pattern P detection signals from the decision circuit 103, in order to perform the following switching control for the filter circuit 105.

Referring to FIG. 7, when the video data of the frame number F1 of FIG. 7 is supplied to the terminal 100, the pattern P is detected by the decision circuit 103. On detection of the pattern P, the CPU 104 causes the video data of the first field and the video data of the second field to be stored in the memory for the first field 111 and the memory for the second field 112. The CPU 104 then causes the video data stored in the memory for the first field 111 and the memory for the second field 112 to be read out therefrom and transferred to the digital filter 113. If the pattern P has been detected, the video data of the first field read out from the memory for the first field 111 and the video data of the second field read out from the memory for the second field 112 are video data of the same frame. At this time, the CPU 104 actuates the filter M among the three filters in the digital filter 113 for generating the SIF video data from the video data of the first and second fields by the filter M. The SIF video data thus generated corresponds to the picture frame number 1 of the film.

When the video data of the frame number F2 of FIG. 7, that is video data of the frame next to the frame of the pattern P, is supplied to the terminal 100, the CPU 104 causes only the video data of the second field to be stored in the memory for the second field 112, without causing the video data of the first field from the field memory 101 to be stored in the memory for the first field 111. The CPU then causes only the video data of the second field stored in the memory for the second field 112 to be read out and transferred to the digital filter 113. Alternatively, it is possible for the CPU 104 to cause the video data of the first and second fields from the field memory 101 to be stored in the memories for the first and second fields 111, 112 and to cause the video data of the second field only from the memory for the second field 112 to be read out and transferred to the digital filter 113 without causing the video data of the first field to be read out from the memory for the first field 111. At this time, the CPU 104 actuates the filter L, among the three filters in the digital filter 113, and causes the filter L to generate the SIF video data from the second field video data. The SIF video data, thus generated, corresponds to the picture frame number 2 of the film.

When the video data of the frame numbers F3 and F4 of FIG. 7, that is video data of the second and third frames as from the pattern P frame, is supplied to the terminal 100, the CPU 104 causes the second field video data to be stored in the memory for the second field 112, without causing storage of the video data of the first field of the frame number F3 read out from the field memory 111, and further causes video data of the first field of the next frame number F4 to be stored in the memory for the first field 111. The CPU then causes the video data of the first field of the frame number F4 to be read out from the memory for the first field 111 and to be transferred to the digital filter 113. At this time, the CPU 104 actuates the filter M of the three filters in the digital filter 113 and causes the filter M to generate the SIF video data to be generated from the video data of the second field of the frame number F3 and from the video data of the first field of the frame number F4. The SIF video data, thus generated, corresponds to the picture frame number 3 of the film.

When the video data of the frame number F5 of FIG. 7, that is video data of the fourth frame as from the frame of the pattern P, is supplied to the terminal 100, the CPU 104 causes only the video data of the first field from the field memory 101 to be stored in the memory for the first field 111, without causing the video data of the second field to be stored in the memory for the second field 112. The CPU then causes the video data of the first field stored in the memory for the first field 111 to be read out and transferred to the digital filter 113.

Alternatively, it is possible for the CPU 104 to cause the video data of the first and second fields from the field memory 101 to be stored in the memories for the first and second fields 111, 112 and to cause the video data of the first field only from the memory for the first field 111 to be read out and transferred to the digital filter 113 without causing the video data of the second field to be read out from the memory for the second field 112. At this time, the CPU 104 actuates the filter K, among the three filters in the digital filter 113, and causes the filter K to generate the SIF video data from the first field video data. The SIF video data, thus generated, corresponds to the picture frame number 4 of the film.

If the video data of the frame number F6 of FIG. 7 is supplied to the terminal 100, the pattern P is detected by the decision circuit 103, so that he CPU 104 operates in the same way as with the frame number F1, that is, it causes the video data of the first and second fields from the field memory 101 to be stored in the memory for the first field 111 and the memory for the second field 112, respectively, and subsequently causes the video data stored in the memory for the first field 111 and the memory for the second field 112 to be read out and transferred to the digital filter 113. At this time, the CPU 104 actuates the filter M, among the three filters in the digital filter 113, and causes the filter M to generate the SIF video data from the first and second field video data. The SIF video data, thus generated, corresponds to the picture frame number 5 of the film.

The pictures of the picture frame numbers 6, 7 and 8 are regenerated as in the case of the picture frame numbers 2, 3 and 4, respectively. The SIF size pictures, thus restored, are the same as the pictures of the original film, and are improved in picture quality, since there is no risk of a picture of another frame being mixed into the restored picture as was the case with the conventional device.

Figure 10:
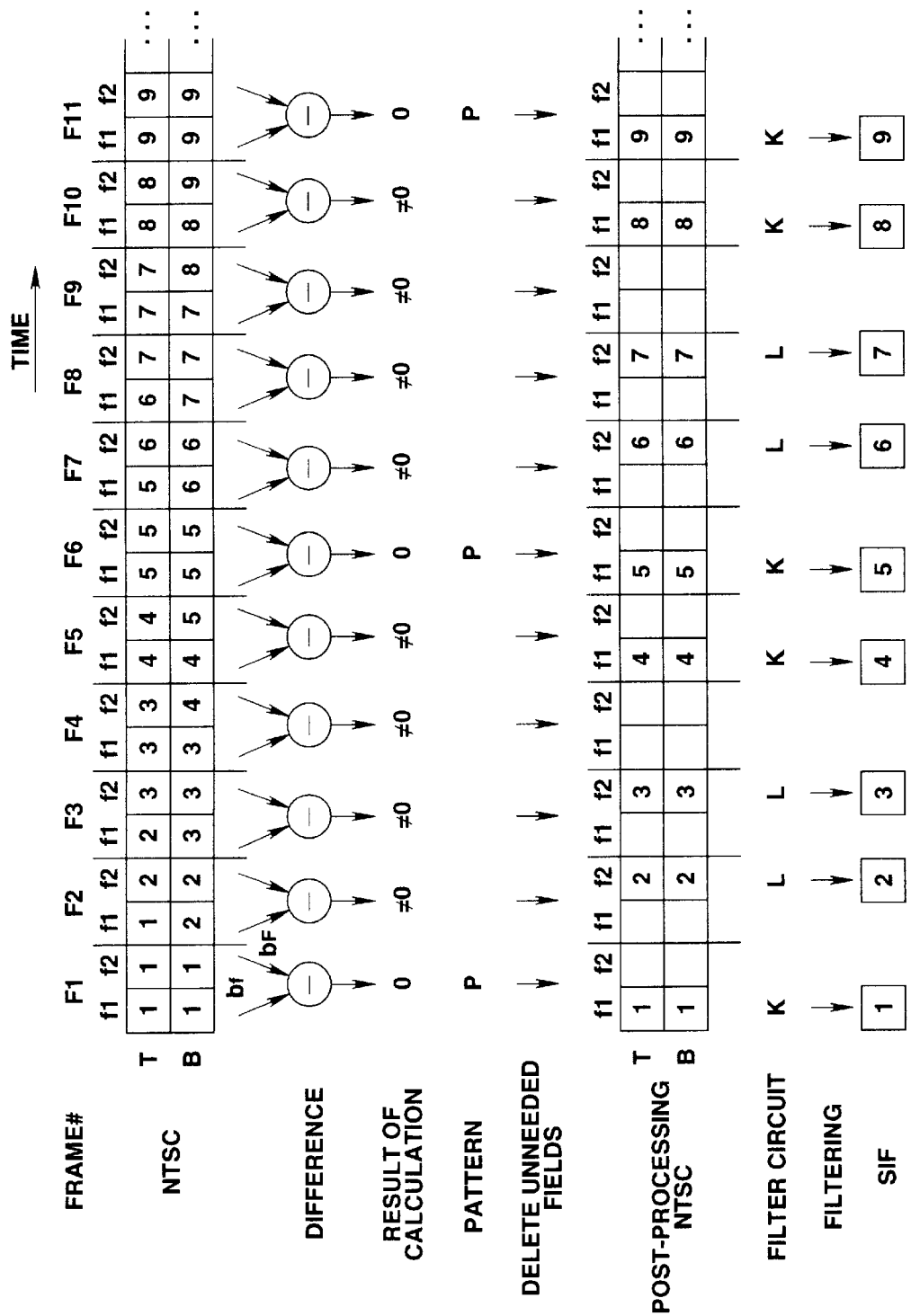
FIG. 10 illustrates a reverse tele-cine conversion of a second example of the first embodiment.
Figure 11:
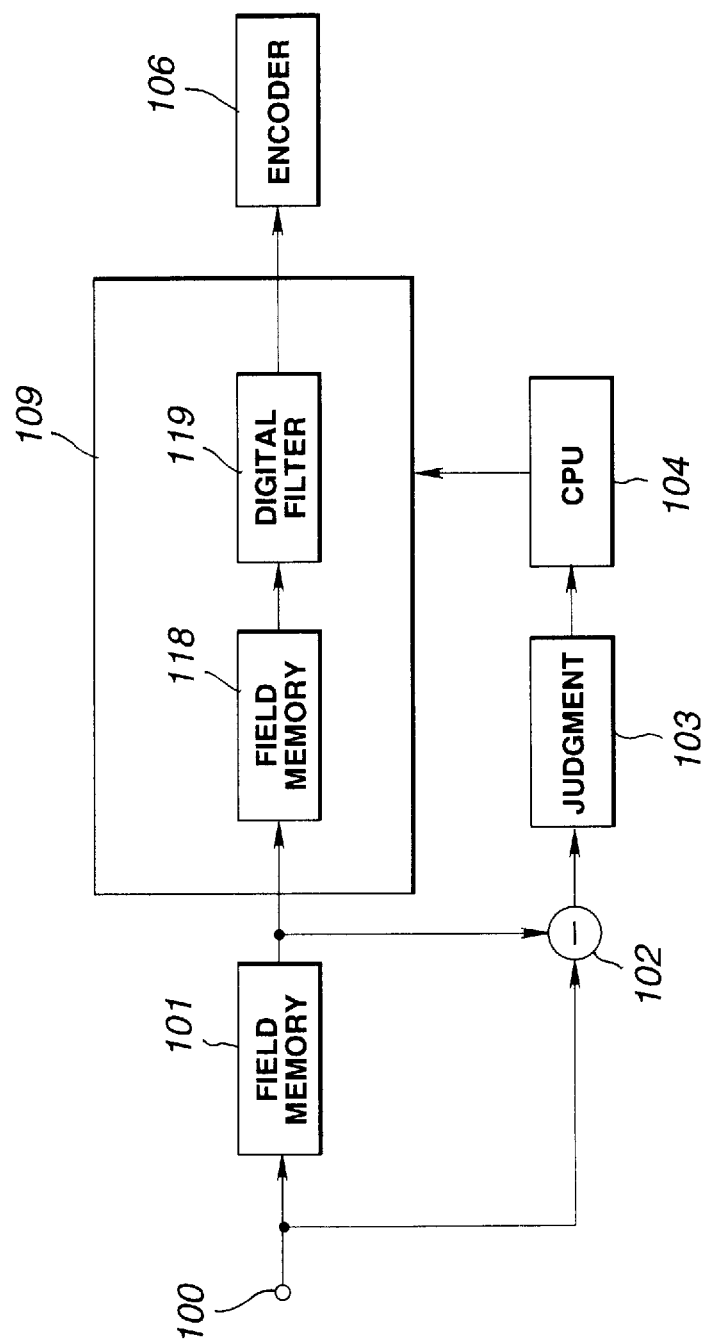
FIG. 11 is a schematic block circuit diagram of a picture signal processing apparatus for reverse tele-cine conversion according to a second example.

As a modification of a first illustrative example of the first embodiment, that is a second illustrative example thereof, it is possible to delete unneeded fields responsive to the detected pre-set pattern P and to regenerate picture signals corresponding to the picture frames of the film source from one of the first and second fields f1 and f2, as shown in FIG. 10.

The arrangement of the reverse tele-cine conversion device according to the second illustrative example, in which picture signals corresponding to picture frames of the film from data only of the first field f1 or the second field f2 as described above, is shown in FIGS. 10 and 12.

Figure 12:
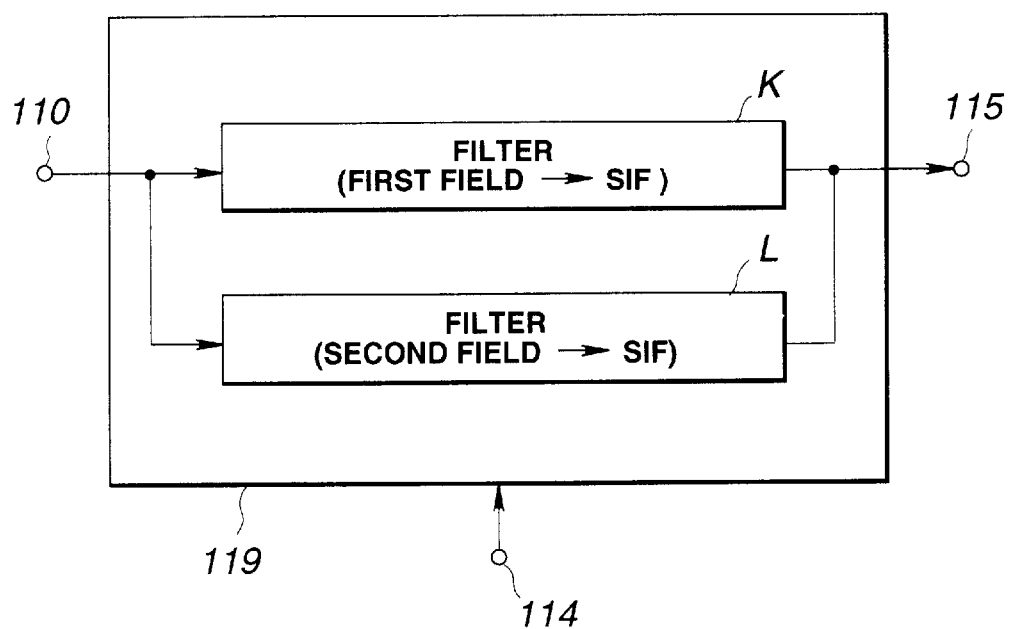
FIG. 12 is a schematic block circuit diagram showing a second example of a digital filter.

The present second example differs from the first example shown in FIGS. 8 and 9 in that a filter circuit 109 of FIG. 7 in the reverse tele-cine conversion device of the second illustrative example has a field memory 118 for holding one-field data only of the first and second fields f1 and f2 and a digital filter 119 having the configuration shown in FIG. 12. The digital filter 119 has a filter K for generating the SIF video data from the video data of the first field and a filter L for generating the SIF video data from the video data of the second field. The CPU 104 is also responsive to a detection signal from the decision circuit 103 to do write/readout for the field memory 118 while switching between the filters K and L in the digital filter 119.

It is possible with the present second illustrative example to reduce the number of the field memories and that of the filters by one to simplify the structure as well as to reduce the cost.

Figure 13:
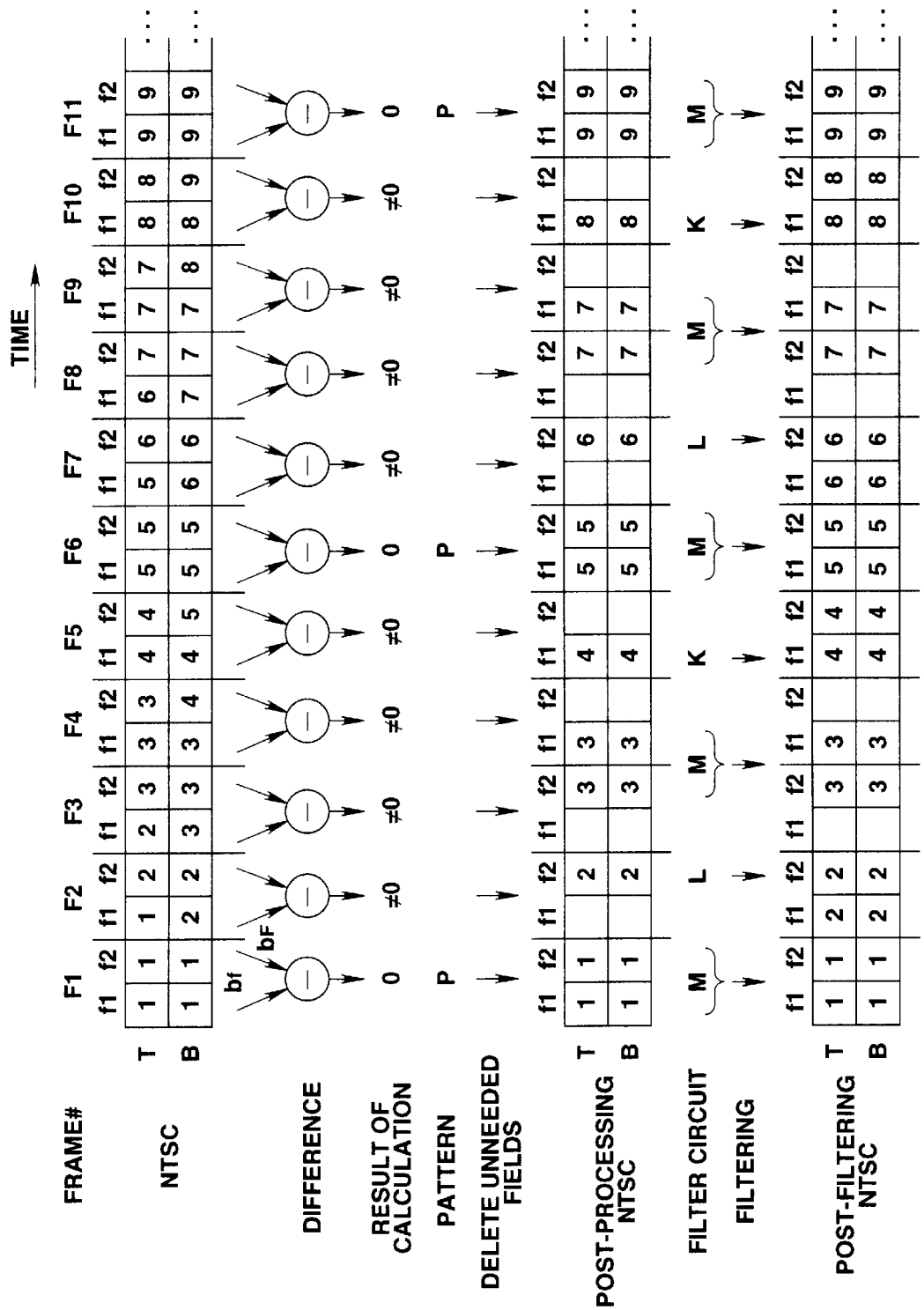
FIG. 13 illustrates reverse tele-cine conversion of a third example.
Figure 14:
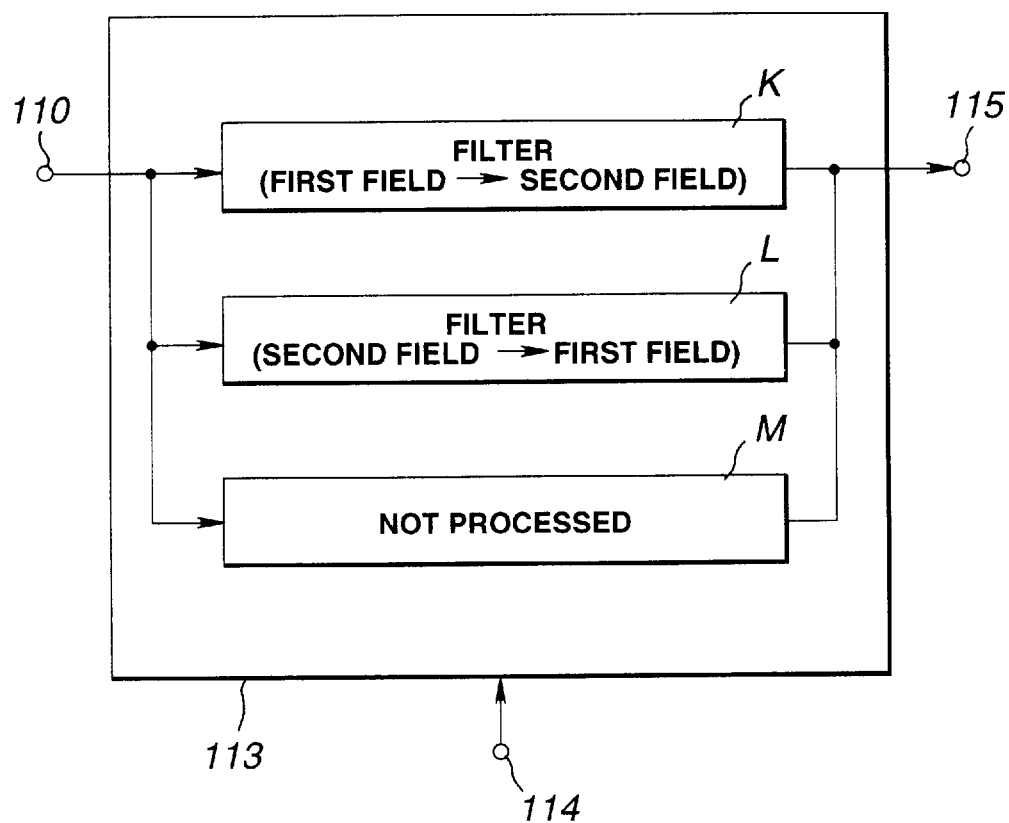
FIG. 14 is a schematic block circuit diagram of a defect filter of a third example.

The above-described first and second illustrative examples are directed to regeneration of the SIF size picture frames from the rec 601 video source. However, as a third illustrative example, pictures of the rec 601 size picture frames may also be regenerated from the rec 601 video source, in which case the processing shown in FIG. 13 is performed. In this figure, the explanation up to the post-processing NTSC is similar to that shown in FIG. 7. However, an arrangement of the digital filter 113 shown in FIG. 14 is used for the present third illustrative embodiment. That is, the digital filter 113 in FIG. 14 has a filter K for generating video data of the second filter from the video data of the first field, a filter L for generating video data of the second filter from the video data of the second field and a filter M not performing filtering for video data of any of the first and second fields.

Referring to FIG. 13, the operation of the reverse tele-cine conversion device employing the digital filter 113 having the arrangement shown in FIG. 10 is explained. Since the structure and the operation of the reverse tele-cine conversion device upstream of the digital filter 113 is the same as that described above, the detailed description is not made for clarity.

First, for the frame number F1 of FIG. 13, the CPU 104 causes video data stored in the memory for the first field 111 and the memory for the second field 112 to be read out and transferred to the digital filter 113. The CPU 104 also causes the video data of the first and second fields to be directly outputted, using the non-operating filter M, and causes video data of rec 601, corresponding to the picture frame number 1, to be generated, as shown at post-processing NTSC in FIG. 13.

Next, for the frame number F2 of FIG. 13, the CPU 104 causes only video data stored in the memory for the second field 112 to be read out and transferred to the digital filter 113. The CPU 104 actuates the filter L of the digital filter 113 and causes the filter L to generate video data of the first field from the video data of the second field. The video data of the generated rec 601 corresponds to the picture frame number 2 of the film source.

Then, for the frame numbers F3 and F4 of FIG. 13, the CPU 104 causes video data stored in the memory for the second field 112 to be read out and transferred to the digital filter 113, while causing video data of the first field of the frame number F4 to be read out from the memory for the first field 111 and transferred to the digital filter 113. The CPU 104 also causes the video data of the first and second fields to be directly outputted, using the non-operating filter M, and causes video data of rec 601, corresponding to the picture frame number 3, to be generated, as shown at post-processing NTSC in FIG. 13.

Next, for the frame number F5 of FIG. 13, the CPU 104 causes only video data stored in the memory for the first field 111 to be read out and transferred to the digital filter 113. The CPU 104 actuates the filter K of the digital filter 113 and causes the filter K to generate video data of the second field from the video data of the first field. The video data of the generated rec 601 corresponds to the picture frame number 4 of the film source.

Next, for the frame number F6 of FIG. 13, for which the pattern P is detected by the decision circuit 103, the CPU 104 causes video data stored in the memory for the first field 111 and the memory for the second field 112 to be read out and transferred to the digital filter 113. The CPU 104 also causes the video data of the first and second fields to be directly outputted, using the non-operating filter M, and causes video data of rec 601, corresponding to the picture frame number 5, to be generated, as shown at post-processing NTSC in FIG. 13.

In the present third illustrative example, the pictures of the picture frame numbers 6, 7 and 8 are regenerated as in the case of the picture frame numbers 2, 3 and 4, respectively. The rec 601 size pictures, thus restored, are the same as the pictures of the original film, and are improved in picture quality, since there is no risk of a picture of another frame being mixed into the restored picture as was the case with the conventional device.

In the third illustrative example, the filter M of the digital filter 113 is a non-operating filter. If the filter L or K is used, resolution in the vertical direction is lowered. In this consideration, the resolution in the vertical direction may also be lowered in the filter M. By lowering the resolution in the vertical direction in the filter M, in keeping with the case of using the filter L or K, the ultimate picture may be rendered unciform in resolution.

Figure 15:
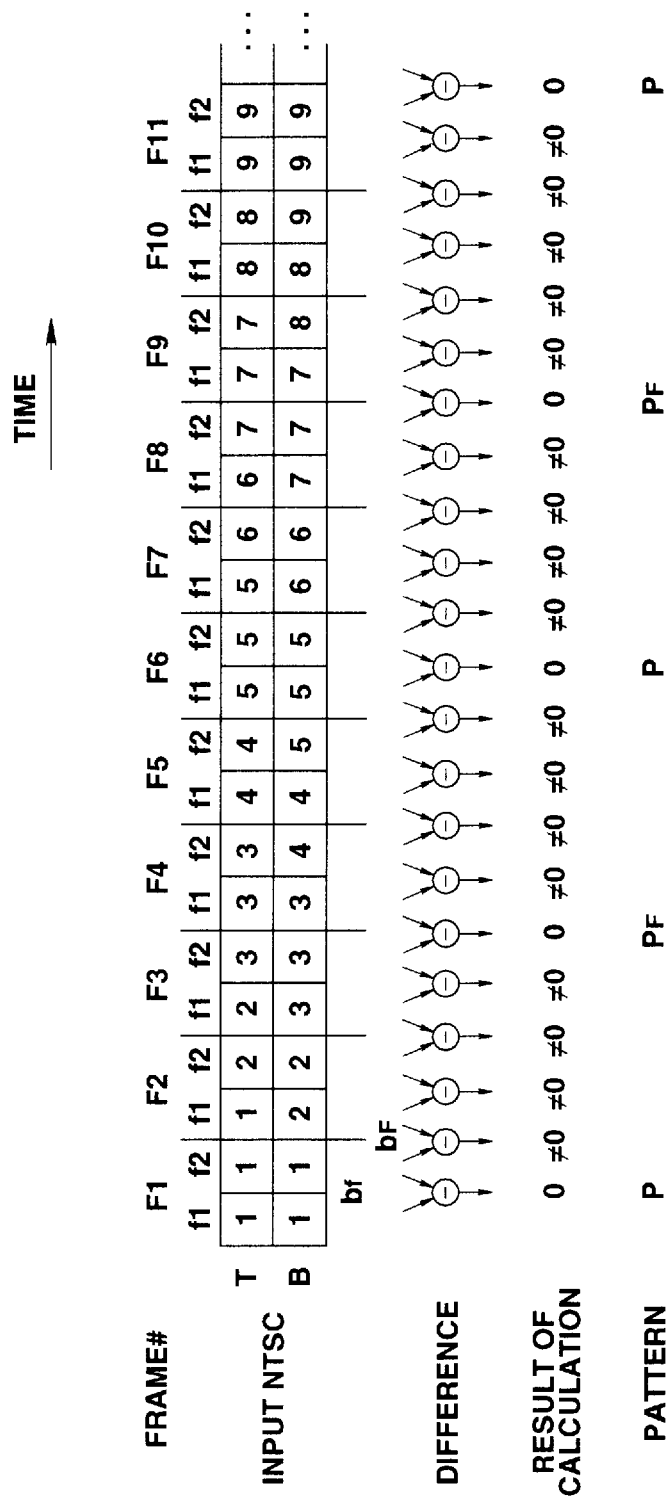
FIG. 15 illustrates the method for preventing mistaken detection of a pattern P.

In the above-described first embodiment, the pattern P is detected only when the difference between the first and second fields of the same frame is found to be substantially equal to zero by the decision circuit 103. As a second embodiment, it is also possible to detect the pattern P by taking the difference between the first and the second fields in the same frame and to detect a pattern PF by taking the pixel-based difference between the second field of a temporally previous one of two temporally consecutive frames and the first field of the other temporally succeeding frame by the decision circuit 103, for improving precision in pattern detection, as shown in FIG. 15.

If, in the present second embodiment, a pattern P is detected, picture signals of a picture frame are regenerated only from the first field of a frame temporally previous to the frame corresponding to the pattern P, while picture signals of a picture frame are regenerated from video data of the first and second fields of the frame corresponding to the pattern P. In a frame temporally succeeding the frame corresponding to the pattern P, picture signals of a picture frame are regenerated only from video data of the second field of the frame. On detection of the pattern $P_F$, picture signals of a picture frame are regenerated from video data of the second field of a temporally previous one of two frames corresponding to the pattern $P_F$ and from video data of the first field of the temporally succeeding one of the two frames. If, in the above-described first and second embodiments, the method of calculating the difference between the pixels of the second field of one of two temporally contiguous and neighboring frames and the pixels of the second field of the other of the two frames is used in conjunction with the method of calculating the difference between the pixels of the first field of one of two temporally contiguous and neighboring frames and the pixels of the first field of the other of the two frames, it can be discriminated whether or not the picture frame boundary of the film at the time of tele-cine conversion is coincident with the boundary $b_f$ of the fields of the video source of the NTSC system.

Figure 16:
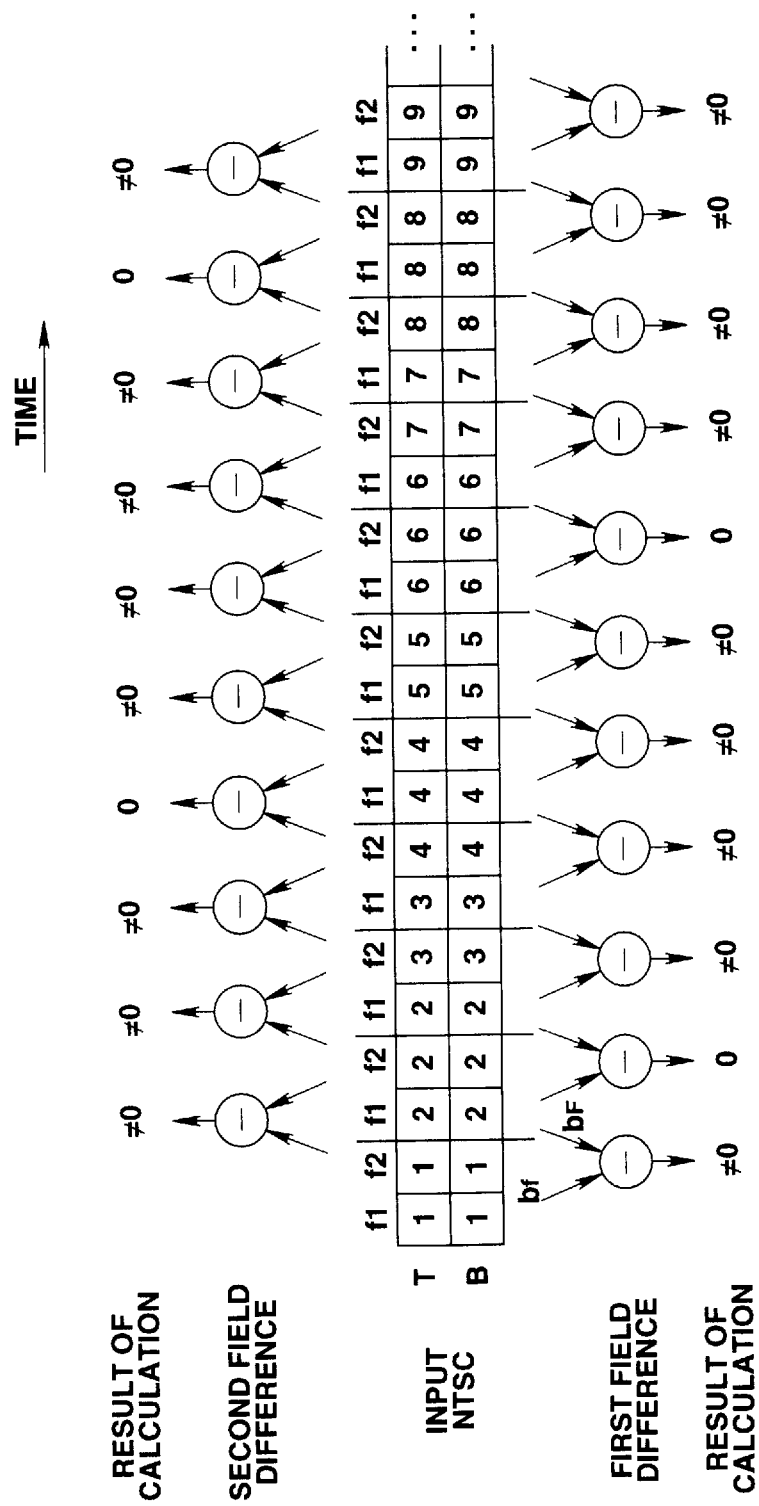
FIG. 16 illustrates a method of discrimination for a case in which the picture frame boundary points are coincident with the field boundary points.
Figure 17:
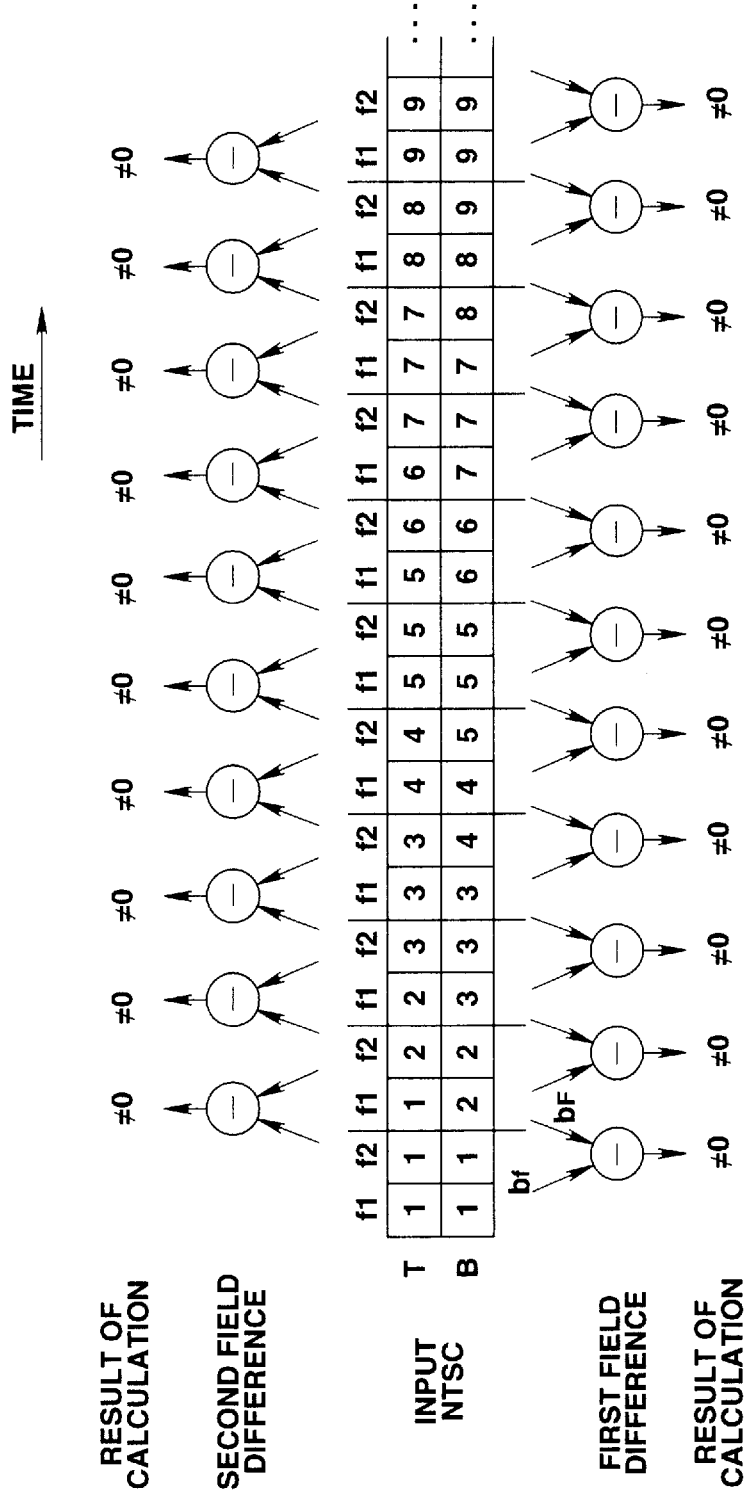
FIG. 17 illustrates a method of discrimination for a case in which the picture frame boundary points are not coincident with the field boundary points.

That is, if, the pixel-based difference is taken between the first fields and between the second fields of two temporally contiguous neighboring frames, and if the picture frame boundary of the film at the time of tele-cine conversion is coincident with the field boundary $b_f$ of the NTSC video source, the difference values substantially become equal to zero at a pre-set time interval, as shown in FIG. 16, whereas, if, in the above case, the picture frame boundary of the film at the time of tele-cine conversion is not coincident with the field boundary $b_f$ of the NTSC video source, the difference values do not become substantially become equal to zero, as shown in FIG. 17. For carrying out calculations of the differences shown in FIGS. 16 and 17, the decision circuit 103 judges possible coincidence in the arrangement of FIG. 8. In addition, a memory capable of storing data of at least two fields is employed in place of the field memory 101. From this memory, field data required for carrying out difference calculations as shown in FIGS. 16 and 17 are read out under control by the CPU 104 so as to be supplied to the subtractor 102.

Figure 2:
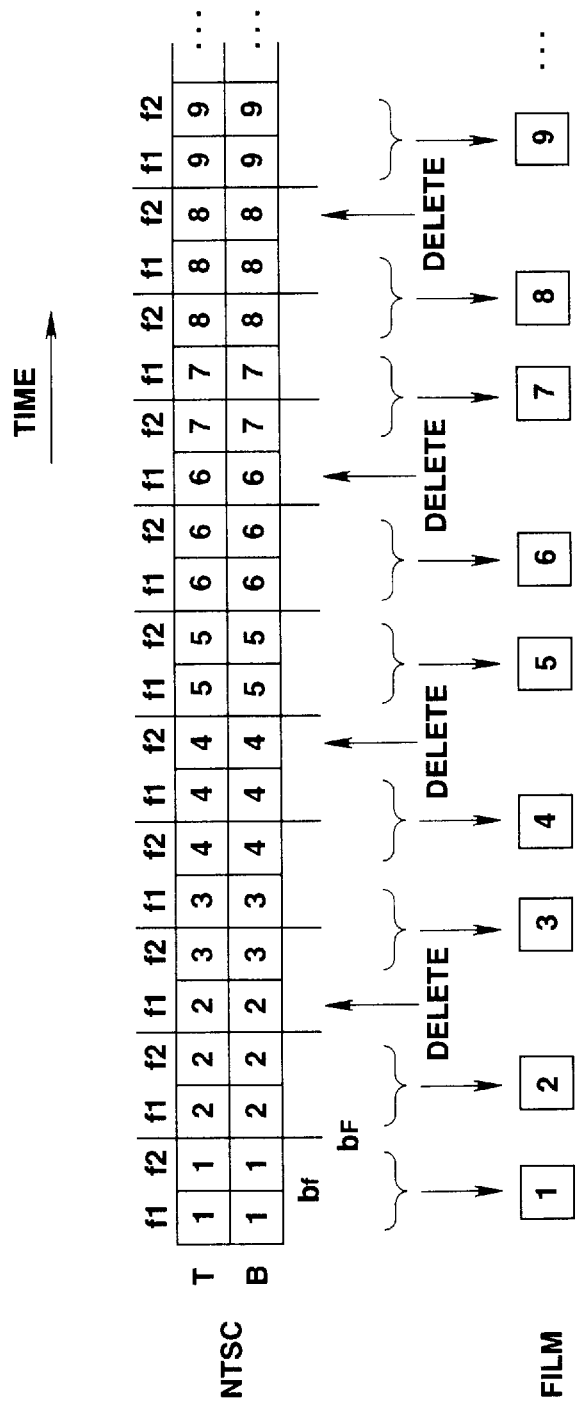
FIG. 2 illustrates usual reverse tele-cine conversion for video source signals for which the picture frame boundary points are coincident with the field boundary points.

If it can be discriminated whether or not the picture frame boundary in the film on tele-cine conversion is coincident with the field boundary $b_f$ of the NTSC video source, as described above, reverse tele-cine conversion of deleting overlapped fields as explained in connection with FIG. 2 may be carried out in case of coincidence between the two boundaries, while the reverse tele-cine conversion of the present embodiment may be carried out only in case of non-coincidence between the two boundaries. The operation of detecting the overlapped fields is carried out by the decision circuit 103, while the operation of deleting the overlapped fields is carried out by the CPU 104 and the memory for the first field 111 and the memory for the second field 112 the write/read operation of which is controlled by the CPU 104.

In both the first and second embodiments, design details of the digital filter occasionally affect picture quality. However, such is a matter of how to design the filters and has no pertinence to the present invention.

Figure 18:
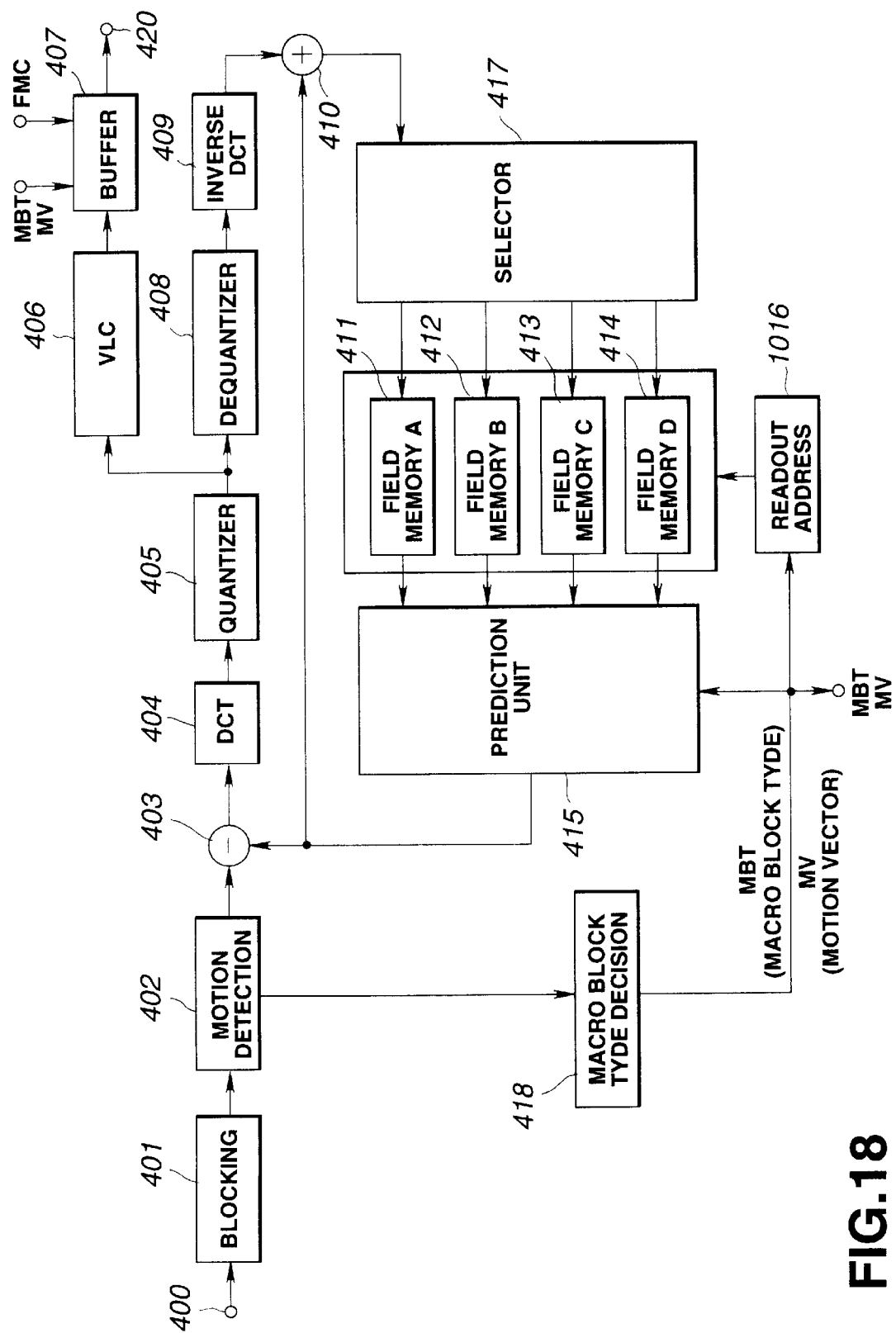
FIG. 18 is a block circuit diagram showing an illustrative arrangement of an encoding circuit.

Referring to FIG. 18, an illustrative construction of the encoding circuit 106 is explained in detail.

In FIG. 18, picture data from the filter circuit 105 of FIG. 5, corresponding to picture frames of the original film obtained on reverse tele-cine conversion, is supplied to a terminal 400. These picture data are supplied to a blocking circuit 401. From this blocking circuit 401, the data are read out as, for example, 16×16 pixel macro-blocks, and sent via a motion detection circuit 402, as later explained, to a difference detection unit 403.

The difference detection unit 403 is also fed with motion-compensated picture data from a set of motion compensator-field memory units, made up of field memory units 411 to 414 and a prediction unit 415, as later explained, and a difference between the picture data is found at the difference detection unit 403.

An output of the detection unit 403 is sent to a DCT circuit 404 for doing orthogonal transform (DCT). The DCT coefficient data, resulting from DCT by the DCT circuit 404, are sent to a quantizer 405. The quantized data of the quantizer 405 are outputted via a VLC circuit 406 for doing variable length coding, such as Huffman coding or run-length coding, and a buffer 407, at an output terminal 420 as encoded data.

If fed with field mode modifying signals FMC, the VLC circuit 406 encodes the field mode modifying signal FMC and a reference field signal RFC specifying which field should be copied in place of the removed field.

The motion compensator-field memory units 411 to 414 are fed with quantized data from the quantizer 405 via a dequantizer 408 performing the reverse operation of quantization by the quantizer 405 and an inverse DCT circuit 409 performing a reverse operation of DCT by the DCT circuit 404, and with data sent via an adder 410 and selected by a selector 417. In the adder 410, the output of the inverse DCT circuit 408 is summed to an output read out from the field memory units 411 to 414 and sent via the prediction unit 415. Although not shown, a signal for prohibiting overflow of the buffer 407 is fed back from the buffer 407 to the quantizer 405.

The picture data, outputted on the macro-block basis from the blocking circuit 401, is sent to the motion detection circuit 402, which then detects, on the macro-block basis, the motion vector between pictures and the sum of differences of absolute values of respective pixels, and outputs these data (data of the motion vector between pictures and data of the sum of differences of absolute values). The data of the sum of the differences of the absolute values is transmitted to a macro-block type decision circuit 418. The macro-block type decision circuit 418 decides the macro-block type on the macro-block basis.

The prediction unit 415 of the motion compensator-field memory units is fed with the motion vector MV and with the macro-block type MBT from the macro-block type decision circuit 418, while the field memory units 411 to 414 are fed with read-out addresses generated by a read-out address generator 1016 based on the motion vector MV and the macro-block type MBT. Thus the motion compensator-field memory units 411 to 414 and the prediction unit 415 perform motion compensation using the motion vector MV and the macro-block type MBT for motion prediction.

In general, an apparatus doing the encoding of the MPEG standard is in need of a frame interchanging operation. Thus a frame memory is required for the blocking circuit 401 shown in FIG. 18. If the frame memory of the blocking circuit 401 is used simultaneously as the field memory in the above-described embodiment, there is no necessity of newly providing the field memory in the present embodiment, thus preventing the arrangement from being increased in size for reducing rise in cost.

What is claimed is:

1. A picture signal processing method for regenerating picture signals from interlaced picture signals obtained on tele-cine conversion of a film source picture, the interlaced picture signals including a portion of non-coincidence of a field boundary or a frame boundary with a boundary of said film source picture, said method comprising the steps of:

calculating a difference value between the interlaced picture signals defining respective fields of said film source picture;

detecting a pattern in the interlaced picture signals based on the calculated difference value;

selecting fields defined by the interlaced picture signals based on the detected pattern and removing the selected fields;

regenerating the picture signals corresponding to the film source picture from the interlaced picture signals after the selected fields have been removed; and encoding the regenerated picture signals for compression.

2. The picture signal processing method as claimed in claim 1, wherein the difference value is calculated between a first field and a second field making up a frame.

3. The picture signal processing method as claimed in claim 1, wherein a first difference value is calculated between a first field and a second field making up a frame and a second difference value is calculated between said second field and a first field of another frame temporally succeeding said frame;

wherein a first pattern based on said first difference value and a second pattern based on said second difference value are detected;

wherein the selected fields are removed based on the detected first and second patterns; and wherein the picture signals are regenerated based on the detected first and second patterns.

4. The picture signal processing method as claimed in claim 1, wherein a first difference value is calculated between a first field of a temporally previous one of two temporally neighboring frames of the interlaced picture signals and a first field of a temporally succeeding one of the two frames; a second difference value is calculated between a second field of the temporally previous one of the two frames and a second field of the temporally succeeding one of the two frames; and the non-coincidence between the boundary of the film source picture and the field or frame boundary of the interlaced picture signals is discriminated based on said first and second difference values.

5. The picture signal processing method as claimed in claim 4, wherein if the boundary of the film source picture is coincident with the field or frame boundary of the interlaced picture signals, overlapped fields are detected based on the first and second difference values, the overlapped fields are deleted from the interlaced picture signals and the picture signals corresponding to the film source picture are regenerated.

6. The picture signal processing method as claimed in claim 1, wherein a first operation of regenerating the picture signals from the picture signals of a first field of interlaced scanning, a second operation of regenerating the picture signals from the picture signals of a second field of the interlaced scanning, and a third operation of regenerating the picture signals from the picture signals of temporally contiguous first and second fields of the interlaced scanning are respectively enabled in response to the detected pattern.

7. The picture signal processing method as claimed in claim 6, wherein a resolution of the picture signals obtained by the first and second operations is matched to a resolution of the picture signals obtained by the third.

8. The picture signal processing method as claimed in claim 1, wherein said step of detecting is performed at a predetermined time interval comprised of a number of frames.

9. A picture signal processing apparatus for regenerating picture signals from interlaced picture signals obtained on tele-cine conversion of a film source picture, the interlaced picture signals including a portion of non-coincidence of a field boundary or a frame boundary with a boundary of said film source picture, said apparatus comprising:

difference value calculating means for calculating a difference value between the interlace picture signals defining respective fields of said film source picture;

pattern detecting means for detecting a pattern in the interlaced picture signals based on the calculated difference value;

field selecting and removing means for selecting fields defined by the interlaced picture signals based on the detected pattern and for removing the selected fields;

regenerating means for regenerating the picture signal corresponding to the film source picture from the interlaced picture signals after the selected fields have been removed; and encoding means for encoding the regenerated picture signals for compression.

10. The picture signal processing apparatus as claimed in claim 9, wherein said difference value calculating means calculates the difference value between a first field and a second field making up a frame.

11. The picture signal processing apparatus as claimed in claim 9, wherein said difference value calculating means calculates a first difference value between a first field and a second field making up a frame and a second difference value between said second field and calculates a first field of another frame temporally succeeding said frame, wherein said pattern detecting means detects a first pattern based on said first difference value and a second pattern based on said second difference value, wherein said field selecting and removing means removes the selected fields based on the detected first and second patterns; and wherein said regenerating means regenerates the picture signals based on the detected first and second patterns.

12. The picture signal processing apparatus as claimed in claim 9, wherein said difference value calculating means calculates a first difference value between a first field of a temporally previous one of two temporally neighboring frames of the interlaced picture signals and a first field of a temporally succeeding one of the two frames and calculates a second difference value between a second field of the temporally previous one of the two frames and a second field of the temporally succeeding one of the two frames; and further comprising discriminating means for discriminating the non-coincidence between the boundary of the film source picture and the field or frame boundary of the interlaced picture signals based on said first and second difference values.

13. The picture signal processing apparatus as claimed in claim 12, further comprising signal processing means having overlapped field detection means for detecting overlapped fields from the the first and second difference values and regenerating means for deleting the overlapped fields from the interlaced picture signals for regenerating the picture signals corresponding to the film source picture, wherein if the boundary of the film source pictures is found by the discriminating means to be coincident with the field or frame boundary of the interlaced picture signals, the picture signals corresponding to the film source picture are regenerated using said signal processing means.

14. The picture signal processing apparatus as claimed in claim 9, wherein said regenerating means includes a first regenerating processing unit for regenerating the picture signals from the picture signals of a first field of interlaced scanning, a second regenerating processing unit for regenerating the picture signals from the picture signals of a second field of the interlaced scanning, and a third regenerating processing unit for regenerating the picture signals from the picture signals of temporally contiguous first and second fields of the interlaced scanning, said first, second and third regenerating processing units being respectively enabled in response to the detected pattern.

15. The picture signal processing apparatus as claimed in claim 14, wherein a resolution of the first and second regeneration processing units is the same as a resolution of the third regenerating processing unit.

16. The picture signal processing apparatus as claimed in claim 9, wherein said pattern detection means detects the pattern at a predetermined time interval comprised of a number of frames.

* * * * *